United States Patent
Wu (10) Patent No.: US 7,565,750 B2
(45) Date of Patent: Jul. 28, 2009

(54) PLUMB PROBE ASSEMBLY FOR A LEVEL MEASURING DEVICE

(75) Inventor: Dick Wu, Tucheng (TW)

(73) Assignee: Finetek Co., Ltd., Taipei Hsien (TW)

( * ) Notice: Subject to any disclaimer, the term of this patent is extended or adjusted under 35 U.S.C. 154(b) by 29 days.

(21) Appl. No.: 12/000,744

(22) Filed: Dec. 17, 2007

(65) Prior Publication Data

US 2009/0151180 A1 Jun. 18, 2009

(51) Int. Cl.
*G01C 15/10* (2006.01)
(52) U.S. Cl. ........................................................ 33/392
(58) Field of Classification Search ................... 33/365, 33/391, 392, 393, 394, 398
See application file for complete search history.

(56) References Cited

U.S. PATENT DOCUMENTS

| | | | | |
|---|---|---|---|---|
| 1,538,746 A * | 5/1925 | Reneau | ........................ | 33/393 |
| 2,592,425 A * | 4/1952 | Jackson | ....................... | 33/392 |
| 2,594,823 A * | 4/1952 | Suverkrop | ................... | 33/392 |
| 2,621,421 A * | 12/1952 | Owens | ......................... | 33/393 |
| 2,673,398 A * | 3/1954 | Baumgart | ..................... | 33/393 |
| 2,795,053 A * | 6/1957 | Wohlstrom | ................... | 33/332 |
| 4,461,091 A * | 7/1984 | Gammon | ....................... | 33/392 |
| 4,625,428 A * | 12/1986 | Griffin | .......................... | 33/392 |
| 6,948,253 B1 * | 9/2005 | Lin | ............................... | 33/392 |
| 2002/0162237 A1 * | 11/2002 | Bartimus | ...................... | 33/392 |
| 2004/0128845 A1 * | 7/2004 | Bartimus | ...................... | 33/392 |
| 2006/0242852 A1 * | 11/2006 | Lin | .............................. | 33/392 |

\* cited by examiner

*Primary Examiner*—G. Bradley Bennett
(74) *Attorney, Agent, or Firm*—Muncy, Geissler, Olds & Lowe, PLLC (57) ABSTRACT

A plumb probe assembly for a level measuring device has a plumb and a connection assembly. The plumb has an inner connecting tube. The connection assembly has two connectors and two clip brackets. The connectors are slidably mounted together while one of the connector firmly connects to the inner connecting tube of the plumb. The clip brackets are movably connected together by at least one resilient device supplying a clipping force and clip around the connectors to hold connectors firmly together. When a force greater than the clipping force, applied to the plumb, the clip brackets separate and the plumb falls into the particulates in the container. The plumb will not cause damage to a particulate discharging device and will disconnect with the connection assembly. A replacement plumb may then be attached to the connection assembly for continued operation.

19 Claims, 7 Drawing Sheets

PLUMB PROBE ASSEMBLY FOR A LEVEL MEASURING DEVICE

BACKGROUND OF THE INVENTION

1. Field of the Invention

The present invention relates to a measuring device, especially to a plumb probe assembly for a measuring device that detects heights of particulates added to a container.

2. Description of the Prior Arts

Particulates including, but not limited to animal feeds, cements, plastic grains or corns comprising grains, lumps and powders are stored in containers. The container has a top, a bottom, a level measuring device and a particulate discharging device. The level measuring device is mounted on the top of the container to detect a fill level of the particulates and has a controlling assembly and a conventional plumb probe assembly. The controlling assembly has a spool, a line and a motor. The line is wound around the spool and has a distal end. The motor connects to and rotates the spool to allow the spool to selectively wind or unwind the line. The conventional plumb probe assembly is metal and connects to the distal end of the line. The particulate discharging device is mounted on the bottom of the container, stirs and discharges the particulates in the container.

When the conventional plumb probe assembly is lowered into the container and is in contact with a top of the particulates, the conventional plumb probe assembly is partially supported by the particulates and the controlling assembly detects a reduction in tensile force imposed on the line. Therefore, the motor winds the spool, to raise the conventional plumb probe assembly until the controlling assembly detects the tensile force imposed on the line returns to equal the weight of the conventional plumb probe assembly. Accordingly, the fill level of the particulates in the container is known.

However, if the conventional plumb probe assembly is buried by particulates in the container, the motor might overload the line, causing the conventional plumb probe assembly to break off or a weight of the particulates becomes larger than the pulling force of the motor, the line cannot be wound, both effectively turning the particulate discharging device into a permanent on state. Alternatively, stirrers of the particulate discharging device might engage the conventional plumb probe assembly or line, pulling the line and causing damage to the particulate discharging device or tangling the line on the stirrer and turning the particulate discharging device permanently on. Finally, the particulate discharging device can only add particulates to the container and cannot remove particulates from the container. Therefore, any above situation would cause overfilling, leading to a waste of particulates, an increase in cleaning costs and could lead to reduced production or even factory closure.

To overcome the shortcomings, the present invention provides a plumb probe assembly for a level measuring device to mitigate or obviate the aforementioned problems.

SUMMARY OF THE INVENTION

The main objective of the present invention is to provide a plumb probe assembly for a level measuring device to prevent a motor of a controlling assembly and a particulate discharging device from being damaged.

The plumb probe assembly for a level measuring device has a plumb and a connection assembly. The plumb is plastic, hollow and breakable. The connection assembly has a two connectors and two clip brackets. The connectors are slidably mounted together while one of the connector firmly connects to the inner connecting tube of the plumb. The clip brackets are movably connected together by at least one resilient device providing a clipping force, clip around and are partially mounted in the connectors to hold the connectors firmly together with the clipping force.

When the plumb is buried in the particulates, a weight that the particulates impose on the plumb is stronger than the clipping force that the connection assembly is held by the connectors. Therefore, the clip brackets separate away from each other and the plumb falls into the container. The plumb will not cause damage to the particulate discharging device and will disconnect with the connection assembly. People may then mount another plumb to the connection assembly inner connecting tube for continual functioning of the level measuring device.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
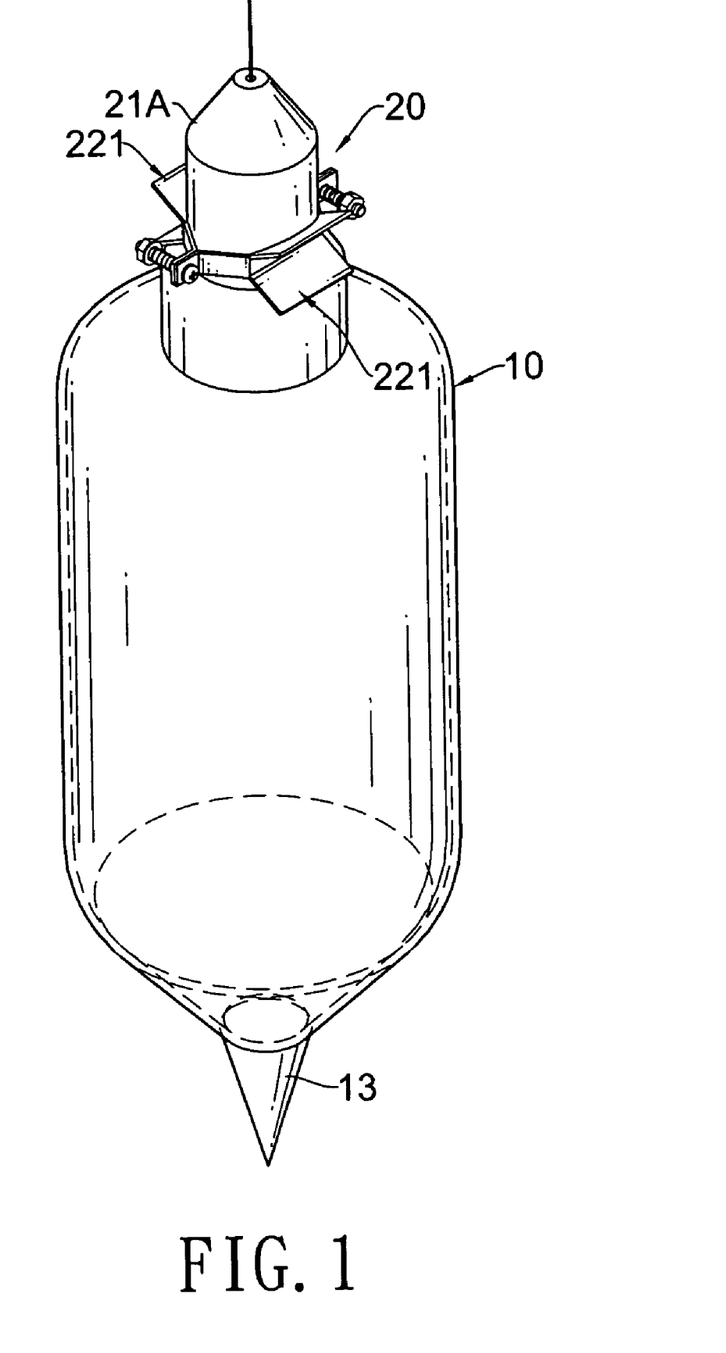
FIG. 1 is a perspective of a first embodiment of a plumb probe assembly for a level measuring device in accordance with the present invention.
Figure 4:
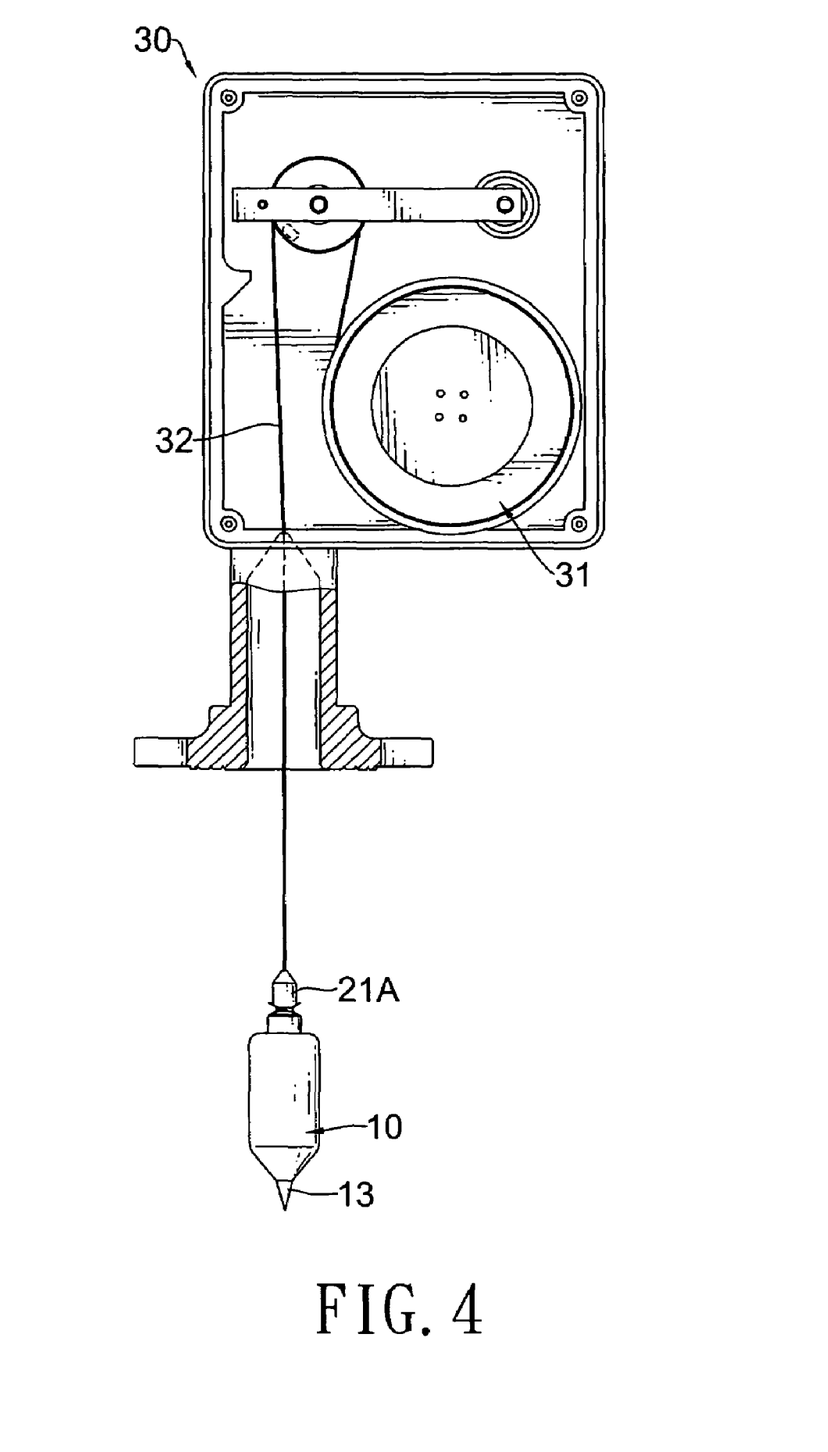
FIG. 4 is an operational side view in partial section of the plumb probe assembly in FIG. 1 being connected to a controlling assembly.

With reference to FIGS. 1 and 4, a level measuring device comprises a controlling assembly (30) and a plumb probe assembly in accordance with the present invention. The controlling assembly (30) comprises a spool (31), a line (32) and a motor. The line (32) is wound around the spool (31) and has a distal end. The motor is connected to and rotates the spool (31) to allow the spool (31) to selectively wind or unwind the line (32). The plumb probe assembly is connected to the distal end of the line (32) and comprises a plumb (10) and a connection assembly (20).

Figure 2:
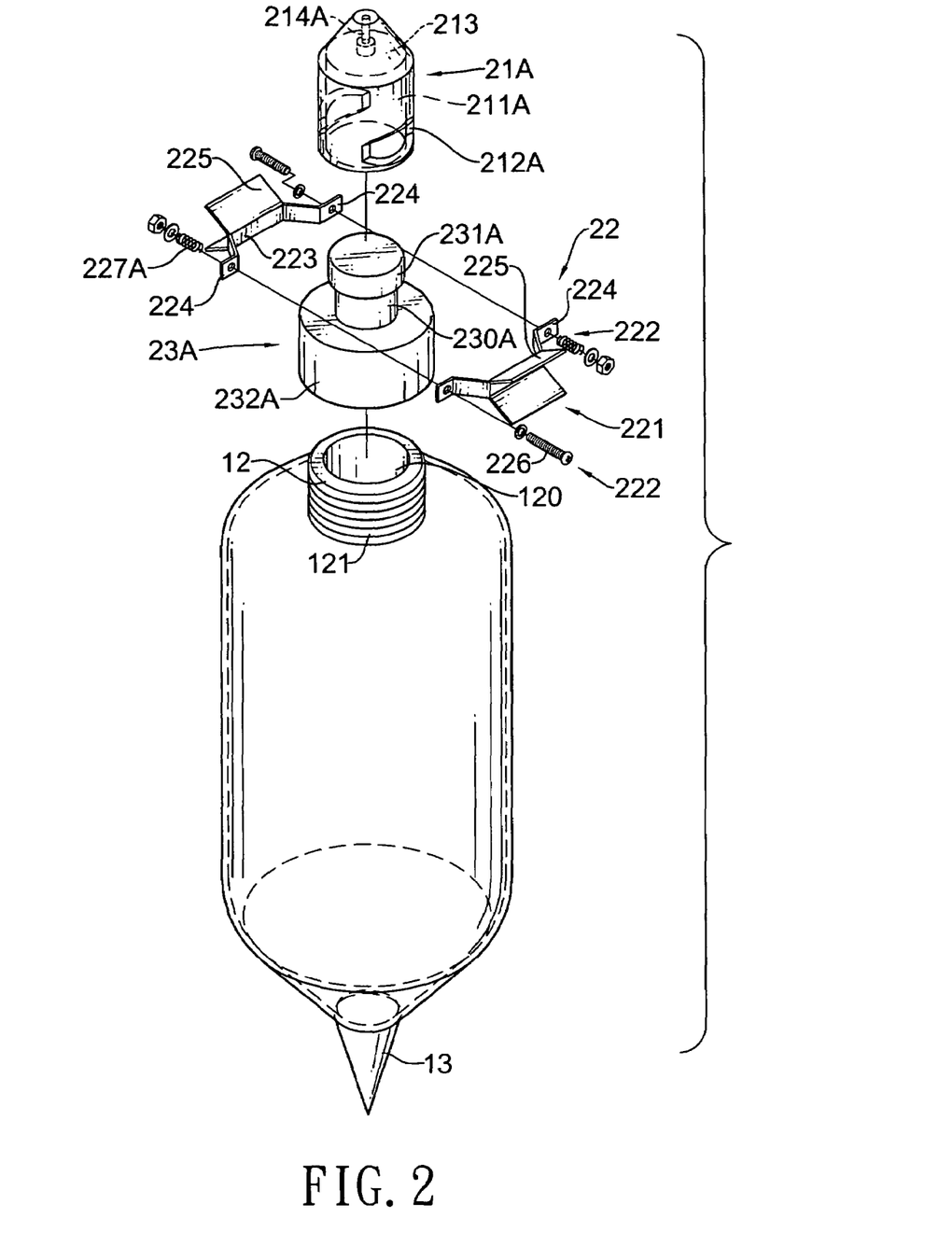
FIG. 2 is an exploded perspective view of the plumb probe assembly in FIG. 1.

With further reference to FIG. 2, the plumb (10) is plastic, hollow, breakable and has a bottom, a top, an optional tip (13) and an inner connecting tube (12). The tip (13) is formed on and protrudes coaxially from the bottom of the plumb (10). The inner connecting tube (12) is formed on and protrudes coaxially from the top of the plumb (10) and has an outer surface, a through hole (120) and an optional external thread (121). The through hole (120) is formed coaxially through the inner connecting tube (12) to allow particulates to be filled into the plumb (10). The external thread (121) is formed around the outer surface of the inner connecting tube (12).

Figure 3:
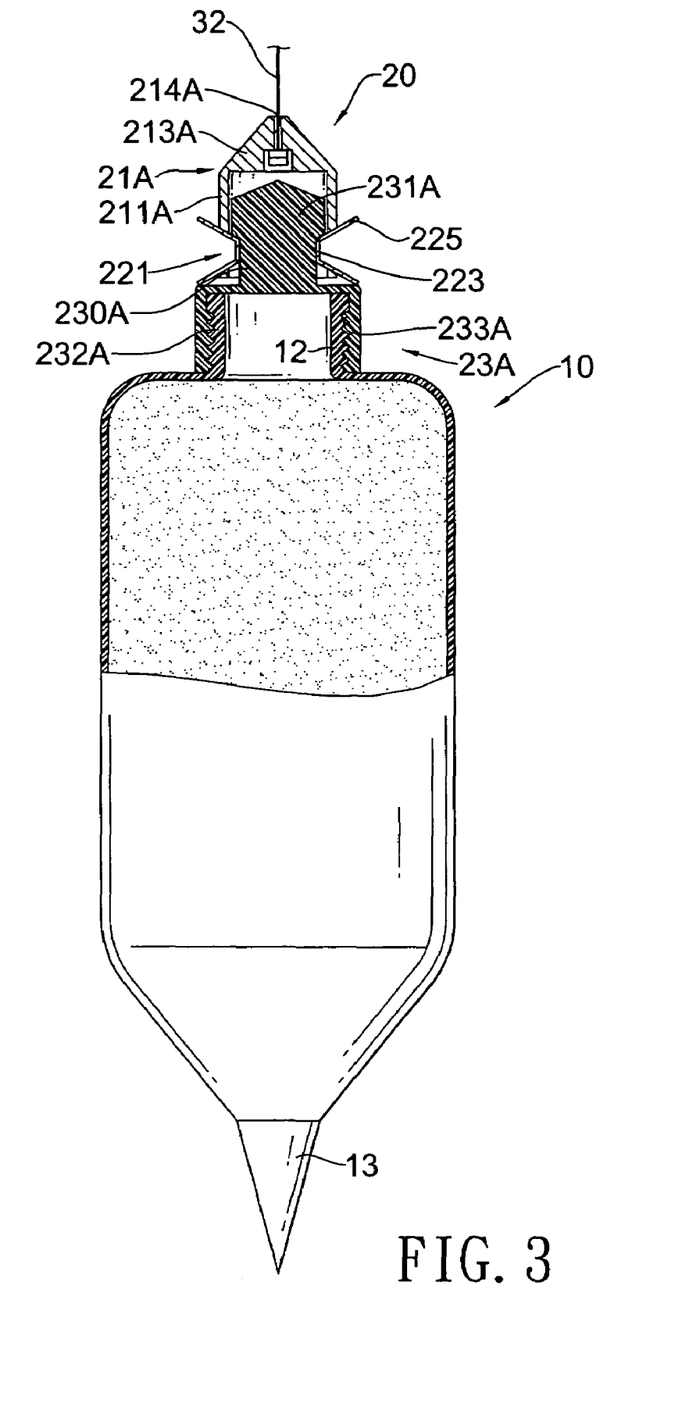
FIG. 3 is a front view in partial section of the plumb probe assembly in FIG. 1.
Figure 6:
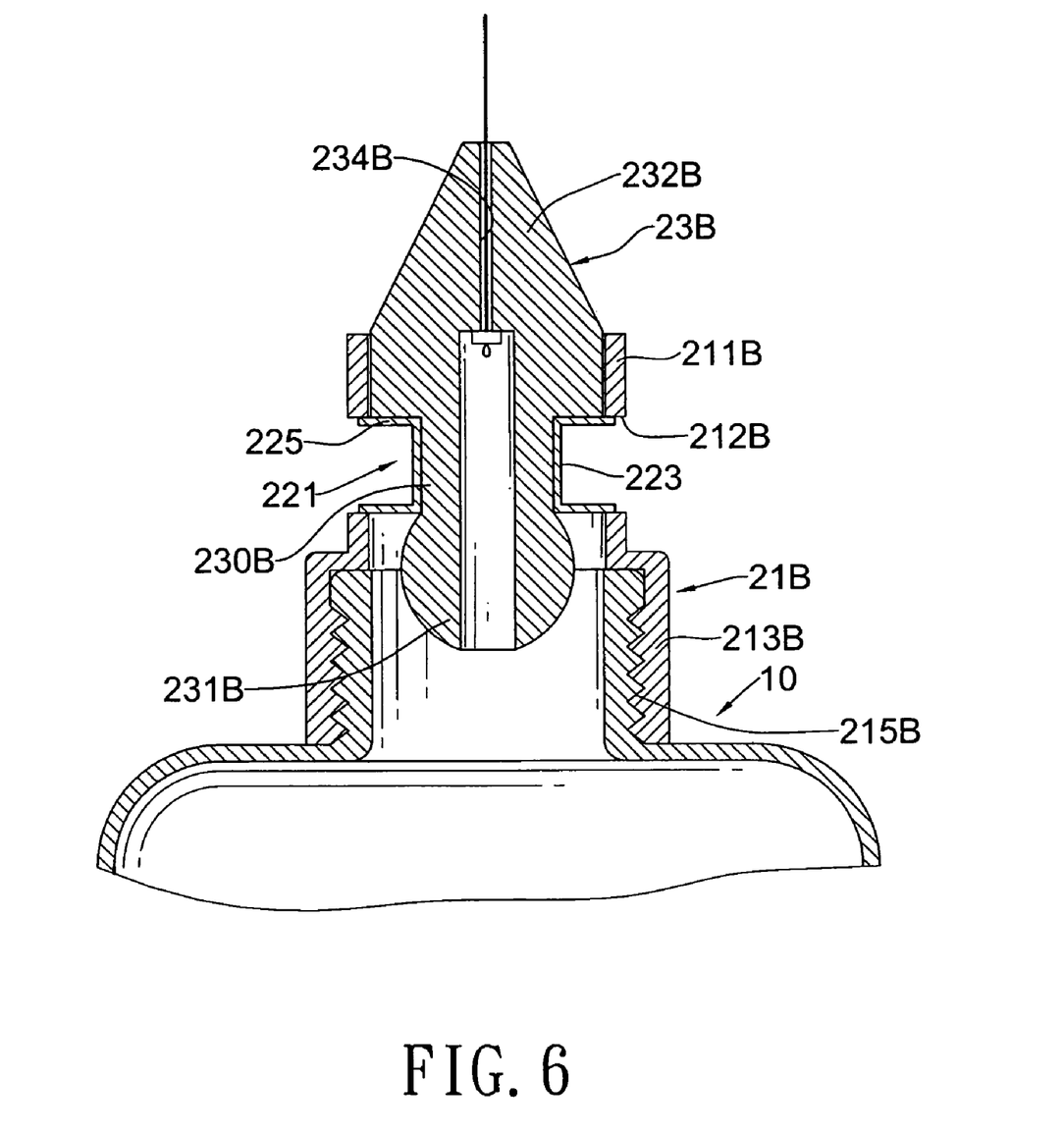
FIG. 6 is an enlarged side view in partial section of a second embodiment of the plumb probe assembly for the level measuring device in accordance with the present invention.

With further reference to FIGS. 3 and 6, the connection assembly (20) is connected to the distal end of the line (32) of the controlling assembly (30) and is mounted on the inner connecting tube (12) of the plumb (10) and comprises an inner connector (23A, 23B), an outer connector (21A, 21B) and a tension clip (22).

The inner connector (23A, 23B) has a neck (230A, 230B), a mounting head (231A, 231B) and a connecting end (232A, 232B). The neck (230A, 230B) has two ends. The mounting head (231A, 231B) is formed on and protrudes from one end of the neck (230A, 230B), may be a disc, conical or substantially spherical and has an abutting surface. The abutting surface of the mounting head (231A, 231B) may be beveled.

The connecting end (232A, 232B) is formed on and protrudes from an other end of the neck (230A, 230B) and may be an outer connecting tube (232A) or a base (232B). The outer connecting tube (232A) is mounted on the inner connecting tube (12) of the plumb (10) and comprise an inner wall and an optional internal thread (233A). The internal thread (233A) is formed around the inner wall of the outer connecting tube (232A), corresponds to and engages the external thread (121) of the inner connecting tube (12) of the plumb (10). The base (232B) is connected to the distal end of the line (32) of the controlling assembly (30), may be a cone and has a line hole (234B). The line hole (234B) is formed coaxially in the base (232B) to allow the line (32) of the controlling assembly (30) to be mounted in and fastened to the base (232B) of the inner connector (23B).

The outer connector (21A, 21B) is mounted slidably around the inner connector (23A, 23B) and comprises a sheath (211A, 211B), two mounting slots (212A, 212B) and a connecting end (213A, 213B). The sheath (211A, 211B) is mounted slidably around the neck (230A, 230B) of the inner connector (23A, 23B) and has a sidewall and an end. The mounting slots (212A, 212B) are formed transversely and oppositely through the sheath (211A, 211B) and corresponds to the neck (230A, 230B) of the inner connector (23A, 23B).

The connecting end (213A, 213B) is formed on and protrudes from the end of the sheath (211A, 211B) and may be a protrusion (213A) or an outer connecting tube (213B). The protrusion (213A) of the outer connector (21A) is formed on and protrudes from the end of the sheath (211A), is connected securely to the distal end of the line (32) of the controlling assembly (30), may be a cone and has a line hole (214A). The line hole (214A) is formed coaxially in the protrusion to allow the line (32) of the controlling assembly (30) to be mounted in and fastened to the protrusion (213A) of the outer connector (21A). The outer connecting tube (213B) is formed on and protrudes from the end of the sheath (211B), is mounted securely on the inner connecting tube (12) of the plumb (10) and comprises an inner surface and an optional inner thread (215B). The inner thread (215B) is formed around the inner surface of the outer connecting tube (213B) and corresponds to and engages the external thread (121) of the inner connecting tube (12).

Figure 7:
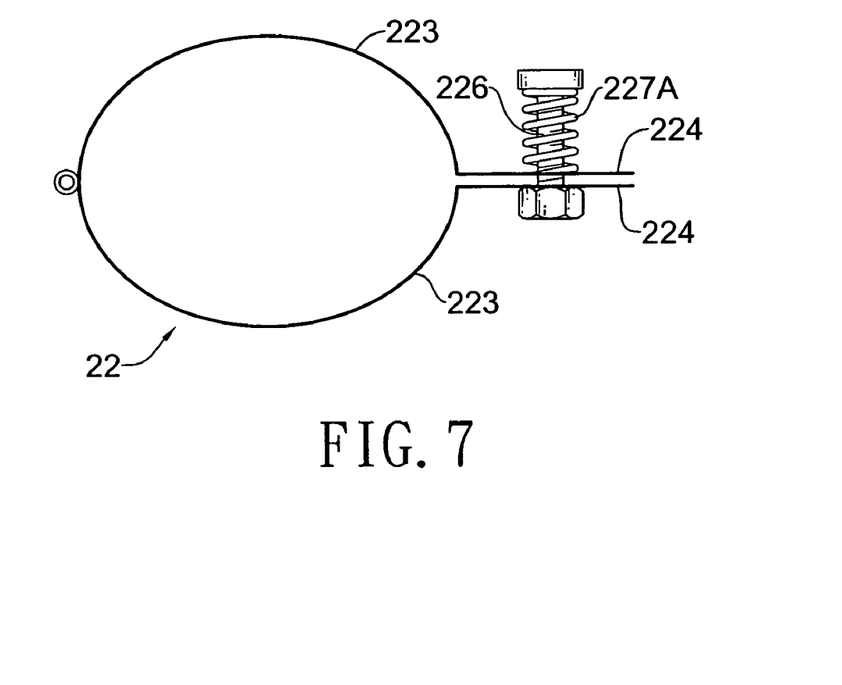
FIG. 7 is a top view of a second variant of a tension clip of the plumb probe assembly for the level measuring device in accordance with the present invention.
Figure 8:
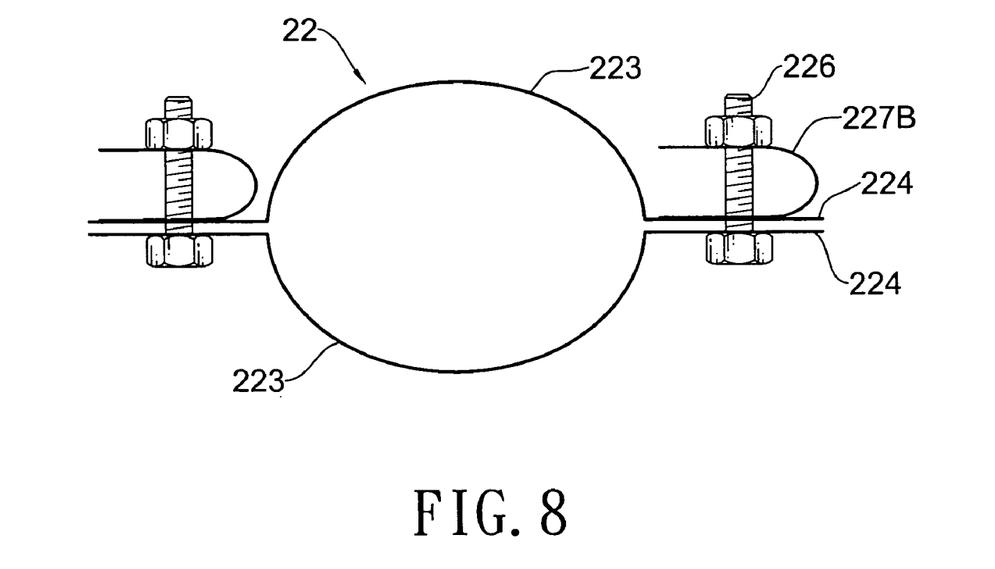
FIG. 8 is a top view of a third embodiment of a connection assembly of the plumb probe assembly for the level measuring device in accordance with the present invention.

With further reference to FIGS. 7 and 8, the tension clip (22) is mounted around the outer connector (21A, 21B) and partially in the mounting slots (211A, 2111B) of the outer connector (21A, 21B), abuts the neck (230A, 230B) of the inner connector (23A, 23B) and the abutting surface of the mounting head (231A, 231B) of the inner connector (23A, 23B) and has two clip brackets (221) and at least one compression assembly (222).

The clip brackets (221) are movably connected to each other to form a loop, correspond to and are mounted around the outer connector (21A, 21B) and respectively and partially in the mounting slots (211A, 211B), abut the neck (230A, 230B) of the inner connector (23A, 23B), selectively hold the outer connector (21A, 21B) firmly to the inner connector (23A, 23B) and each clip bracket (221) has a central segment (223) and two mounting tabs (224).

The central segment (223) abuts the neck (23A, 23B) of the inner connector (23A, 23B) and has two longitudinal edges, two transverse edges and two wings (225). The wings (225) are formed respectively on the longitudinal edges of the central segment (223), abut the abutting surface of the mounting head (231A, 231B) of the inner connector (23A, 23B) and may protrude perpendicularly or obliquely from the central segment (223).

The mounting tabs (224) of each clip bracket (22) are formed respectively on and protrudes from the transverse edges of the central segment (223). Each mounting tab (224) corresponds to one of the mounting tabs (224) of the other clip bracket (22) to form two pair of corresponding mounting tabs (224), and one pair of the corresponding mounting tabs (224) may be mounted pivotally to each other.

The at least one compression assembly (222) is mounted through corresponding mounting tabs (224) of the clip brackets (22), provides a clipping force to allow the clip brackets (22) to be moveably connected to each other and selectively openable and each one of the at least one compression assembly (22) has a fastener (226) and a resilient device (227A, 227B). The fastener (226) is mounted through the corresponding mounting tabs (224) of the clip brackets (22) and has two ends. The ends of the fasteners (226) may be a bolt head, nut, rivet head or the like. The resilient device (227A, 227B) is mounted around the fastener (226) and between the one end of the fastener (226) and the mounting tab (224) of the clip bracket (22) and may be a torsion spring (227A) or a leaf spring (227B).

Figure 5:
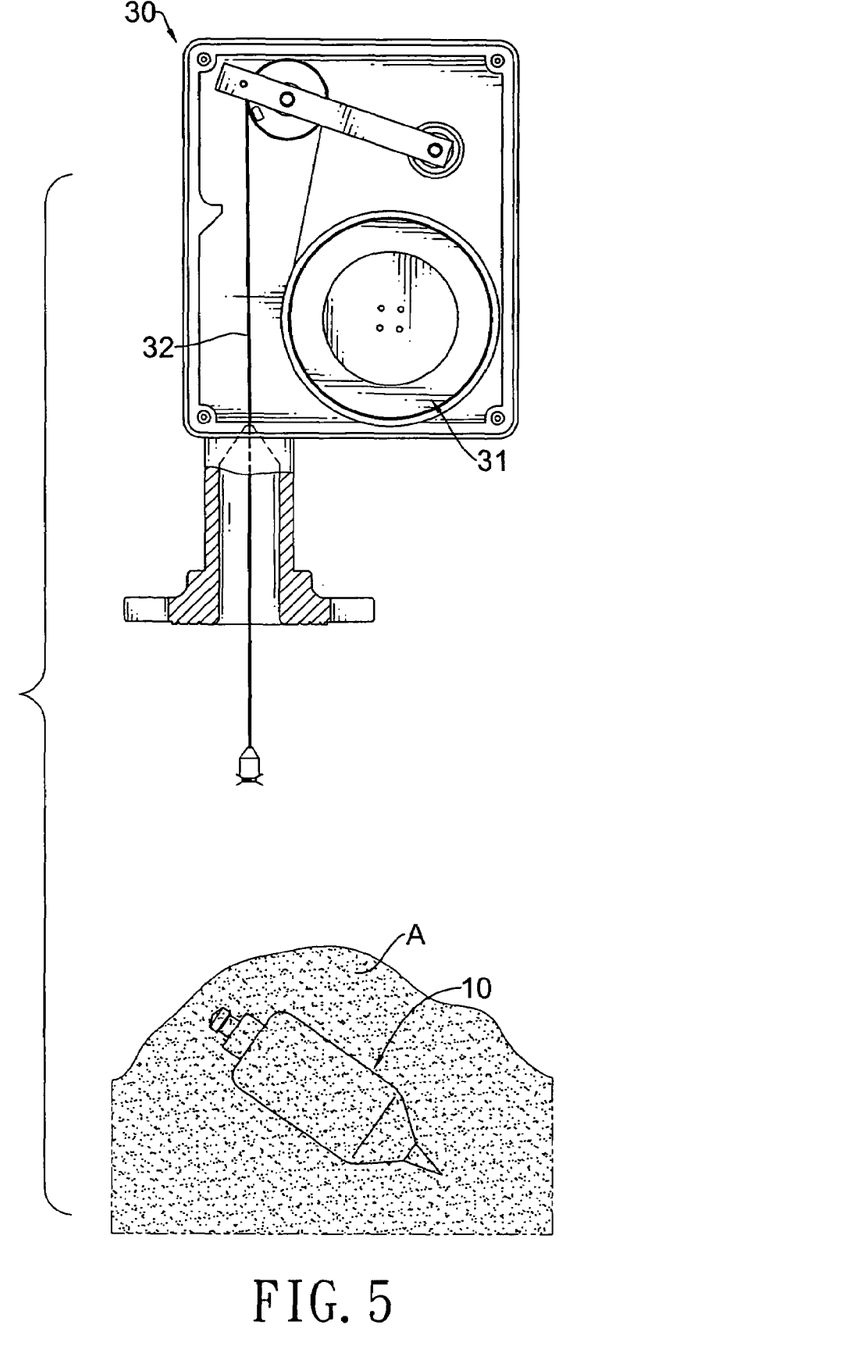
FIG. 5 is an operational side view in partial section of the plumb probe assembly in FIG. 4 shown detached.

With further reference to FIG. 5, a container is filled with particulates (A) including but not limited to animal feeds, cements, plastic grains or corns and has a top, a bottom and a particulate discharging device. The controlling device (30) is mounted on the top of the container. The particulate discharging device is mounted on the bottom of the container. The plumb probe assembly for the level measuring device as described has the following advantages. The particulates (A) are also filled in the plumb (10) to allow the plumb (10) to have a weight. When the plumb (10) is buried in the particulates (A) and the controlling assembly (30) rotates the spool (31) to wind the line (32) around the spool (31), the particulates (A) impose a force on the plumb (10). If the force the particulates (A) impose on the plumb (10) is greater than the clipping force that the compression assembly (221) imposes on the clip brackets (221), the clip brackets (221) will open. Therefore, the abutting surface of the mounting head (231A, 231B) of the inner connector (23A, 23B) moves along the wings (225) of the clip brackets (221), separates the two clip brackets (221) and the plumb (10) falls into the particulates (A) in the container. Since the plumb (10) is breakable and filled with particulates (A) that are going to be measured, the plum (10) will not cause damage to the particulate discharging device and may be removed from the particulates (A) using a sieve or other such means. Furthermore, since the plumb (10) is disconnected from the line (32), the motor may smoothly rotate the spool (31) and will not be damaged, an indicator may be further implemented on the motor to inform maintenance to attach a replacement plumb (10) onto the line (32).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A plumb probe assembly for a level measuring device comprising
   a plumb being hollow, breakable and having
      a bottom;
      a top; and
      an inner connecting tube being formed on and protruding coaxially from the top of the plumb and having an outer surface; and
      a through hole being formed coaxially through the inner connecting tube; and
   a connection assembly being mounted on the inner connecting tube of the plumb and comprising
      an inner connector having
         a neck having two ends;
         a mounting head being formed on and protruding from one end of the neck and having an abutting surface; and
         a connecting end being formed on and protruding from the other end of the neck;
      an outer connector being mounted slidably around the inner connector and comprising
         a sheath being mounted slidably around the neck of the inner connector and having
            a sidewall; and
            an end;
         two mounting slots being formed transversely and oppositely through the sheath and corresponding to the neck of the inner connector; and
         a connecting end being formed on and protruding from the end of the sheath; and
      a tension clip being mounted around the outer connector and partially in the mounting slots of the outer connector, abutting the neck of the inner connector and the abutting surface of the mounting head of the inner connector and having
         two clip brackets are movably connected to each other, corresponding to and being mounted around the outer connector and respectively and partially in the mounting slots, abutting the neck of the inner connector, selectively holding the outer connector firmly to the inner connector and each clip bracket having
            a central segment abutting the neck of the inner connector and having
               two longitudinal edges; and
               two transverse edges; and
            two mounting tabs being formed respectively on and protruding from the transverse edges of the central segment, wherein each mounting tab corresponds to one of the mounting tabs of the other clip bracket to form two pairs of corresponding mounting tabs; and
         at least one compression assembly being mounted through at least one pair of the corresponding mounting tabs of the clip brackets, providing a clipping force to allow the clip brackets to be moveably connected to each other and selectively openable and each one of the at least one compression assembly having
            a fastener being mounted through a corresponding pair of the corresponding mounting tabs of the clip brackets and having two ends; and
            a resilient device being mounted around the fastener and between the one end of the fastener and a corresponding one of the mounting tabs of the clip brackets.

2. The plumb probe assembly for a level measuring device as claimed in claim 1, wherein
   the connecting end of the inner connector is an outer connecting tube being mounted on the inner connecting tube of the plumb and comprising an inner wall; and
   the connecting end of the outer connector is a protrusion being formed on and protruding from the end of the sheath and having a line hole being formed coaxially in the protrusion.

3. The plumb probe assembly for a level measuring device as claimed in claim 1, wherein
   the connecting end of the inner connector is a base having a line hole being formed coaxially in the base; and
   the connecting end of the outer connector is an outer connecting tube being formed on and protruding from the end of the sheath, being mounted securely on the inner connecting tube of the plumb and comprising an inner surface.

4. The plumb probe assembly for a level measuring device as claimed in claim 2, wherein the central segment of each clip bracket further has two wings being formed respectively on the longitudinal edges of the central segment, abutting the abutting surface of the mounting head of the inner connector.

5. The plumb probe assembly for a level measuring device as claimed in claim 3, wherein the central segment of each clip bracket further has two wings being formed respectively on the longitudinal edges of the central segment, abutting the abutting surface of the mounting head of the inner connector.

6. The plumb probe assembly for a level measuring device as claimed in claim 4, wherein the ends of the fastener of the at least one compression assembly are respectively a bolt head and a nut.

7. The plumb probe assembly for a level measuring device as claimed in claim 5, wherein the ends of the fastener of the at least one compression assembly are respectively a bolt head and a nut.

8. The plumb probe assembly for a level measuring device as claimed in claim 6, wherein
   the inner connecting tube of the plumb further has an external thread being formed around the outer surface of the inner connecting tube; and
   the outer connecting tube of the inner connector further comprises an internal thread being formed around the inner wall of the outer connecting tube and corresponding to and engaging onto the external thread of the inner connecting tube of the plumb.

9. The plumb probe assembly for a level measuring device as claimed in claim 7, wherein
   the inner connecting tube of the plumb further has an external thread being formed around the outer surface of the inner connecting tube; and
   the outer connecting tube of the outer connector further comprises an inner thread being formed around the inner surface of the outer connecting tube and corresponding to and engaging the external thread of the inner connecting tube.

10. The plumb probe assembly for a level measuring device as claimed in claim 8, wherein
    the mounting head of the inner connector is conical;

the abutting surfacing of the mounting head of the inner connector is beveled; and the wings of the central segment of each clip bracket protrudes obliquely from the central segment.

11. The plumb probe assembly for a level measuring device as claimed in claim 9, wherein the mounting head of the inner connector is substantially spherical; and the wings of the central segment of each clip bracket protrudes perpendicularly from the central segment.

12. The plumb probe assembly for a level measuring device as claimed in claim 10, wherein one pair of the corresponding mounting tabs is mounted pivotally to each other.

13. The plumb probe assembly for a level measuring device as claimed in claim 11, wherein one pair of the corresponding mounting tabs is mounted pivotally to each other.

14. The plumb probe assembly for a level measuring device as claimed in claim 12, wherein the plumb further has a tip being formed on and protruding coaxially from the bottom of the plumb.

15. The plumb probe assembly for a level measuring device as claimed in claim 13, wherein the plumb further has a tip being formed on and protruding coaxially from the bottom of the plumb.

16. The plumb probe assembly for a level measuring device as claimed in claim 14, wherein the resilient device of the at least one compression assembly is a torsion spring.

17. The plumb probe assembly for a level measuring device as claimed in claim 14, wherein the resilient device of the at least one compression assembly is a leaf spring.

18. The plumb probe assembly for a level measuring device as claimed in claim 15, wherein the resilient device of the at least one compression assembly is a torsion spring.

19. The plumb probe assembly for a level measuring device as claimed in claim 15, wherein the resilient device of the at least one compression assembly is a leaf spring.

* * * * *